United States Patent [19]
McFarlane et al.

[11] Patent Number: 6,083,073
[45] Date of Patent: Jul. 4, 2000

[54] REMOTE CONTROL SIMULATING EDUCATIONAL TOY

[76] Inventors: Andrew McFarlane; Olga McFarlane, both of 9806 Long Meadow Dr., Tampa, Fla. 33615

[21] Appl. No.: 09/137,228

[22] Filed: Aug. 20, 1998

[51] Int. Cl.[7] .................................................. A63H 33/00
[52] U.S. Cl. ............................................. 446/71; 446/73
[58] Field of Search ....................... 340/825.37; 395/169, 395/170; 455/347, 350; 446/71, 73

[56] References Cited

U.S. PATENT DOCUMENTS

| | | | |
|---|---|---|---|
| 4,019,745 | 4/1977 | Mustelier | 345/169 |
| 5,265,274 | 11/1993 | Knutson et al. | 455/347 |
| 5,629,687 | 5/1997 | Sutton et al. | 340/825.37 |
| 5,903,259 | 5/1999 | Brusky et al. | 345/169 |

Primary Examiner—Sam Rimell

[57] ABSTRACT

The hand held battery operated educational toy simulating a remote control comprises: a housing having openings through an upper wall there of; a plurality of translucent push buttons each extending upward through one of the openings. Several of the buttons are a light actuation button and several of the buttons are a sound actuation button. A plurality of switches each linked with one of the push buttons and light emitting circuitry located in the housing produces specific and random lighting patterns. This includes two light emitting elements in the housing not positioned under a push button. The lighting circuitry causes light emitting elements to activate for a short period after the corresponding switches are closed by depressing a light and sound actuation button. Sound producing circuitry located in the housing produces specific words or sounds and includes a sound emitting element through which sound is reproduced for a short period after the corresponding switches are closed by depressing a light and sound actuation push button.

5 Claims, 5 Drawing Sheets

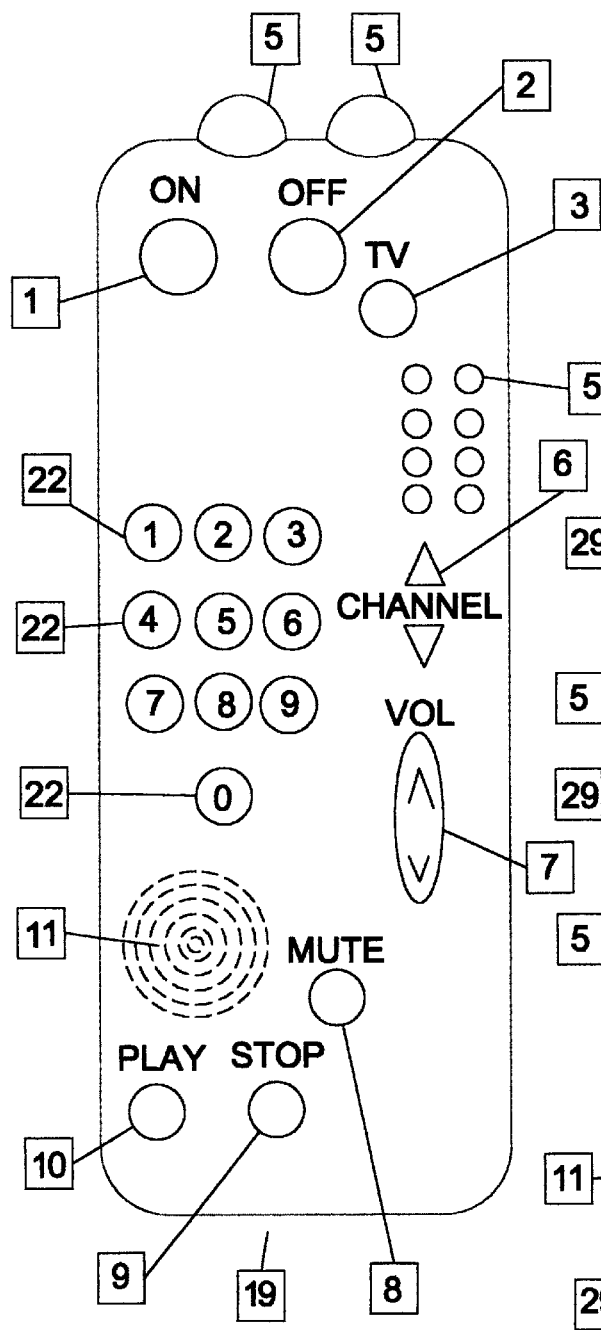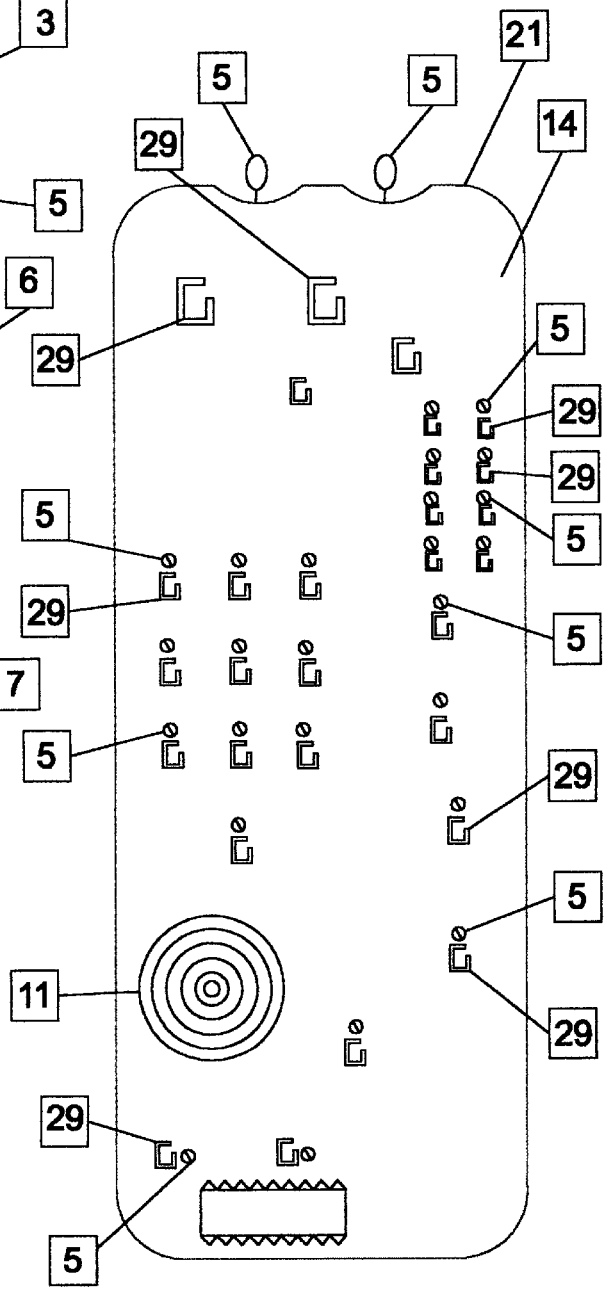

REMOTE CONTROL SIMULATING EDUCATIONAL TOY

BACKGROUND

1. Field of Invention

This invention relates to child's educational toy, specifically a toy which simulates a remote control that incorporates lights and sound.

2. Description of Prior Art

Remote controls are today a very common item in most households. However their potential for use primarily as a toy and educational device has not been pursued.

U.S. Pat. No. 1,569,509 to Leedy (1926) presents a device which simulated sound. However this is a simulated radio and it doesn't use any light features. U.S. Pat. No. 2,314,092 to Kelly (1943) shows an apparatus for artificially producing different sound effects that may be used by children in their teens for putting on their own home broad cast of a radio program. This device is too large to be easily transportable or hand held. Its complexity (requires an external power supply) also excludes use by children in their preteen years. In U.S. Pat. No. 4,762,131 to Okuda (1988) the inventor presents a driller providing light and sound stimuli for stimulating the visuosensory and audio sensory nerves for use in the rehabilitation process of post apoplectic paralytic patients. While this device does have light and sound features it is designed for a very specific use. In addition its size and complexity exclude its use by preteen children as an educational toy. U.S. Pat. No. 5,568,367 to Park (1996) presents a hand held, battery operated remote control with key lighting for controlling an appliance from a remote location. This device contains what are the standard characteristics of most household remotes. However it has no capability of producing sound and no application as an educational toy. In addition the battery chamber is secured in a manner that allows easy access for adults but pose a safety problem for children under the age of ten.

U.S. Pat. No. 5,265,274 to Knutson presents a device which provides combined speaker and key pad functions in a radio assembly. This invention requires a radio (transceiver) for use, and performs very specific function related to a radio. It has no direct application as a toy or educational device and does not generate it's own sound. Any sound emitted by this device must be generated by the radio (transceiver). The sound actuation keys in this device control the radio volume only.

In U.S. Pat. No. 5,629,687 to Sutton the inventor presents a device to remotely monitor security systems with audio monitoring capabilities and a universal operator interface for providing monitoring. This device has no application as an educational toy and requires a telephone system to be operational.

U.S. Pat. No. 5,903,259 to Brusky shows an apparatus for mapping remote control buttons onto keyboard stroke combinations. This device is not a self contained portable unit, with it's own light and sound features. This invention is specialized in it's design to interface between a computer and other electronic devices found in a home.

U.S. Pat. No. 4,019,745 to Mustelier presents an electrical chess game with optical display elements for displaying chess symbols in response to electrical signals from a digital memory entered by a keyboard. This invention has no sound emitting elements.

OBJECTS AND ADVANTAGES

Accordingly several objects and advantages of our invention are to provide an educational toy having the general appearance of a remote control so as to interest and entertain the child with the effects produced and also be of instructional value in training the child to recognize numbers. Several other objects and advantages of the present invention are:

(a) to introduce the child to generally used words (i.e.; ON, OFF, TV., PLAY, STOP).

(b) to introduce the child to a variety of color

© to allow the child to model behavior of adults, and parents, with out the need to use the real remote control in the home. This could eliminate or reduce a minor but common source of conflict.

(d) to be user friendly to children with auditory or visual disabilities.

(e) to be attractive but relatively inexpensive.

(f) to be hand held and transportable.

(g) to be battery operated.

Further objects and advantages of our invention will become apparent from a consideration of the drawings and ensuing description.

DRAWING FIGURES

FIG. 1 shows an exterior top view of the housing of the unit.

FIG. 2 shows a top view of the circuit board.

---

Reference Numerals in Drawings

| | |
|---|---|
| 1 on button | 2 off button |
| 3 TV button | 5 light emitting elements |
| 6 channel button | 7 volume button |
| 8 mute button | 9 stop button |
| 10 play button | 11 speaker 8 |
| 12 power cell chamber | 14 circuit board |
| 15 upper case housing | 16 battery access panel |
| 17 lower case housing | |
| 19 educational toy simulating a remote control | |
| 20 push button receiving holes | |
| 21 upper surface of circuit board | |
| 22 actuation push button | 23 translucent rubber plate |
| 24 insulating plate | 25 hole on insulating plate |
| 26 contact plate | 27 contacts |
| 28 contact plate underside | 29 circuit board contacts |
| 30 contact plate holes | |
| 31 translucent projection guiding plate | |
| 32 holes on guiding plate | |
| 33 recesses in projection guiding plate | |
| 34 lower surface of guiding plate | |
| 35 upper surface translucent rubber plate | |
| 36 lower surfcae rubber plate | |
| 37 depending pressing projections | |

---

SUMMARY

In accordance with the present invention the educational toy simulating a remote control comprises a housing having openings through an upper wall and a plurality of translucent numbered push buttons with each individual push button extending through one opening. Several of the buttons being a light actuation buttons and several of the buttons being a sound actuation button.

OBJECTS AND ADVANTAGES

Accordingly several objects and advantages of our invention are to provide a educational toy having the general appearance of a remote control so as to interest and entertain the child with the effects produced and also be of instructional value in training the child to recognize numbers. Several other objects and advantages of the present invention are:

(a) to introduce the child to generally used words (i.e.; ON, OFF, TV, PLAY, STOP).

(b) to introduce the child to a variety of colors.

© to allow the child to model behavior of adults, and parents, with out the need to use the real remote control in the home. This could eliminate or reduce a minor but common source of conflict.

(d) to be user friendly to children with auditory or visual disabilities.

(e) to be attractive but relatively inexpensive.

(f) to be hand held and transportable.

(g) to be battery operated.

Further objects and advantages of our invention will become apparent from a consideration of the drawings and ensuing description.

Description FIGS. 1 to 7

Figure 3:
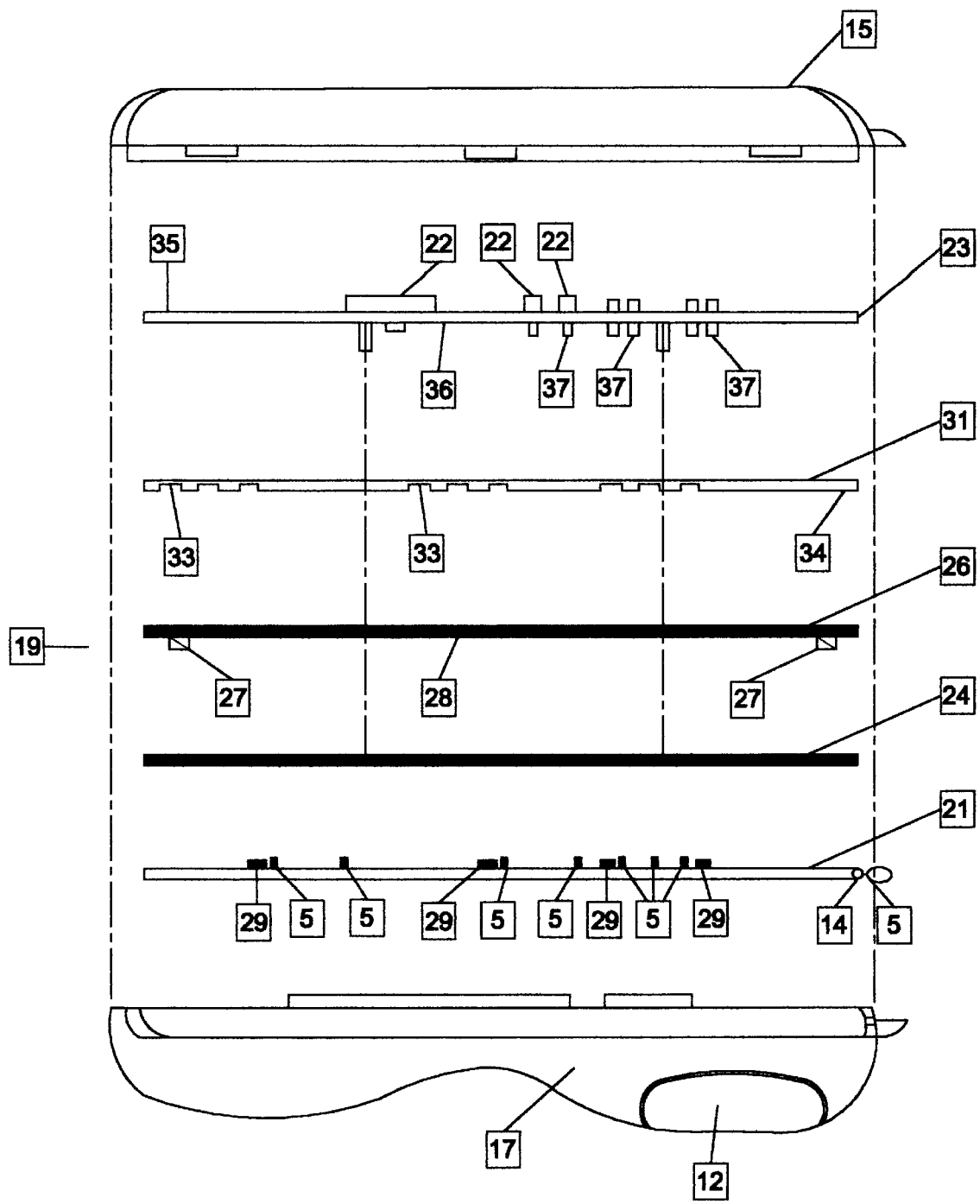
FIG. 3 shows a side view of the major components of the educational toy; (bottom housing, circuit board, four plates and the top housing).
Figure 4:
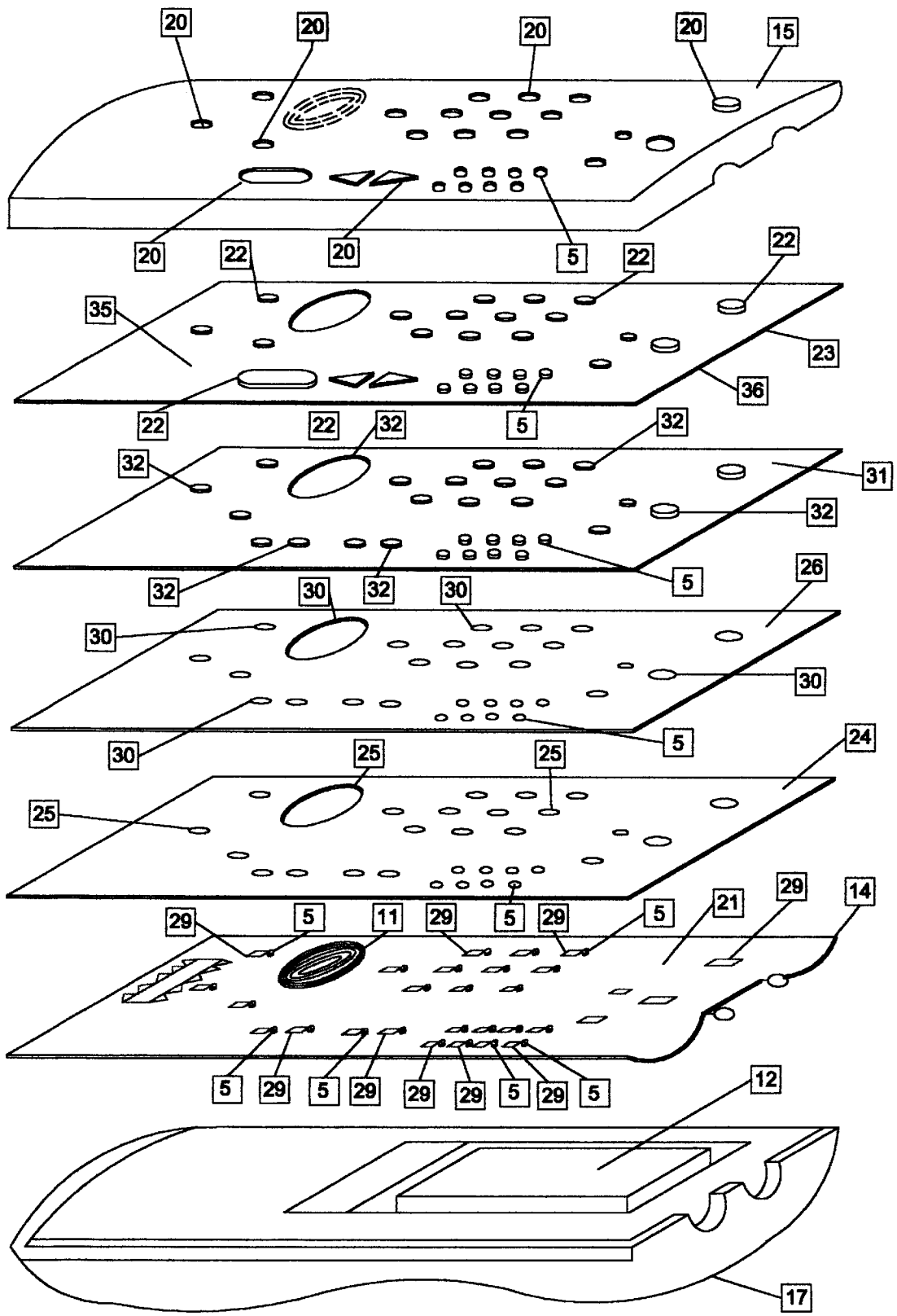
FIG. 4 shows an upper angular view of the bottom housing, circuit board, four plates and top housing.
Figure 5:
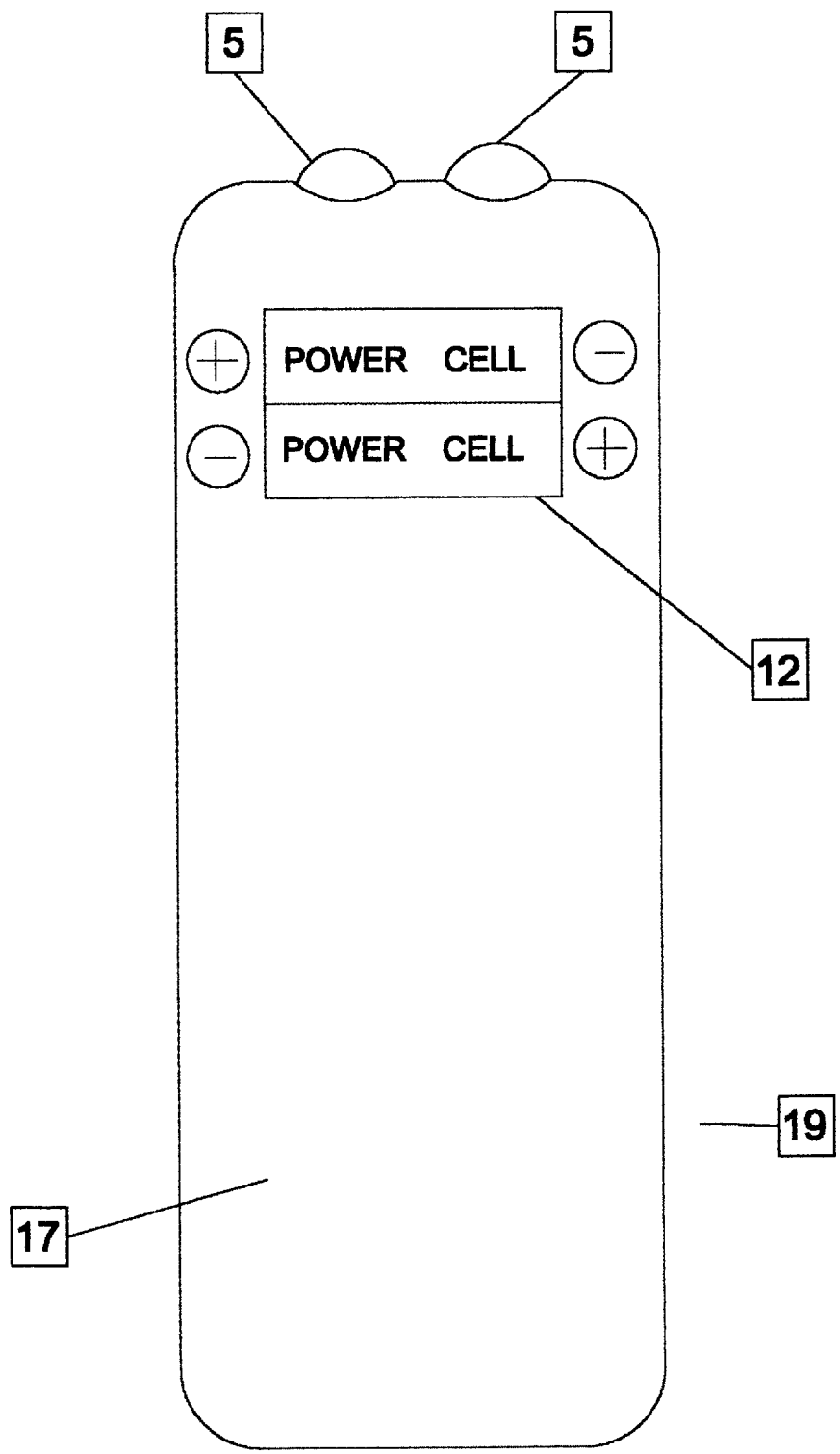
FIG. 5 shows interior location of power cells.
Figure 6:
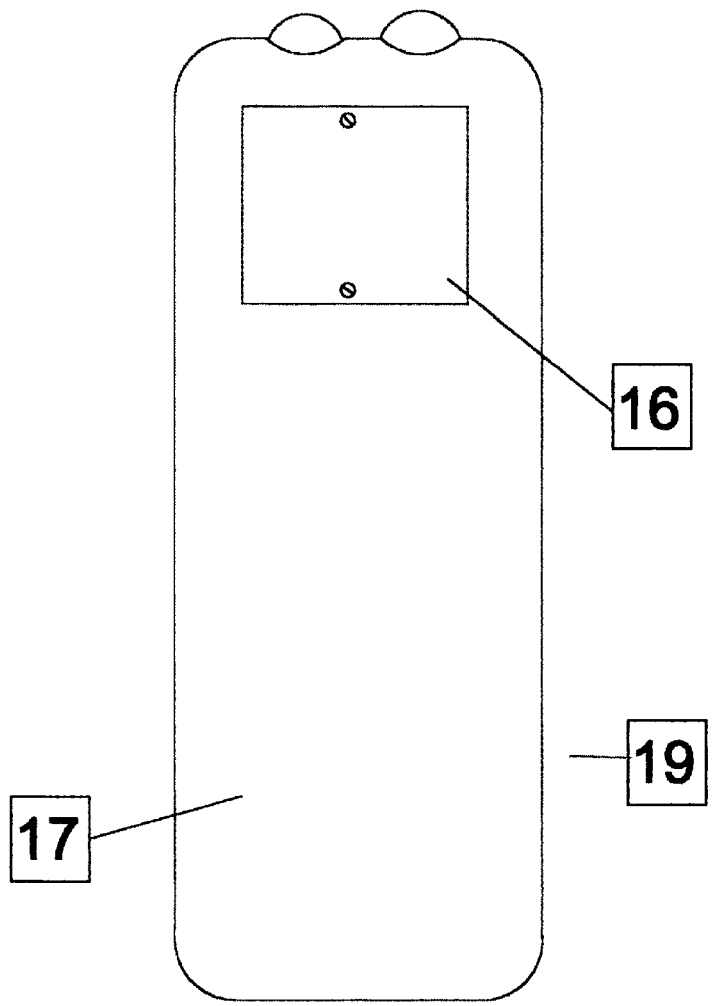
FIG. 6 shows exterior view of the bottom of the housing including access panel to battery chamber.
Figure 7:
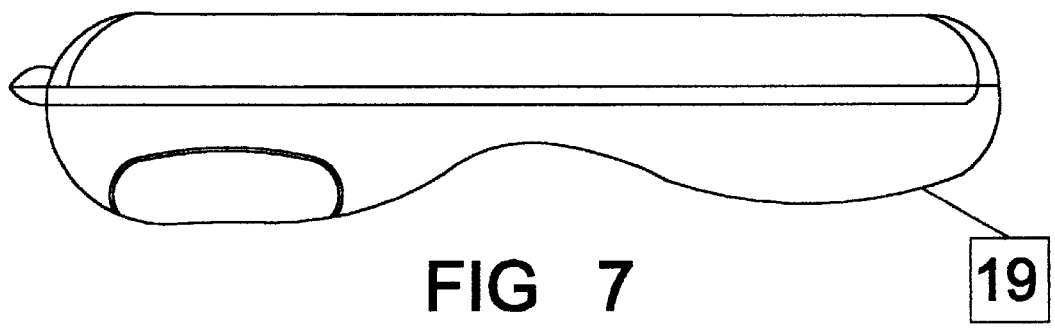
FIG. 7 shows side view of educational toy.

A typical embodiment of the educational toy of the present invention is illustrated in FIG. 1 (top view), FIG. 7 (side view), and FIG. 6 (bottom view). The toy has a length of 7 inches, a width of 2¼ inches, a depth of ¾ of an inch at its widest point and a depth of ½ an inch at its narrowest point. The educational toy includes a lower case or bottom housing 17 (FIG. 5 and 6) having a powercell chamber 12 and a top housing 15 having a plurality of push button receiving holes 20.

On a lower case housing 17 is a circuit board 14 which carries lighting circuits and sound circuits for various functions. The circuit board 14 also has a plurality of light emitting elements, LEDs 5, namely twenty one (21) which protrude from a upper surface 21 of a circuit board 14 light emitting elements 5 are connected with a lighting circuit on the circuit board 14. The lighting circuit is constructed and arranged to cause light emitting elements 5 to emit light for several seconds upon pushing a light actuation push button 22 extending upward from and being part of an upper translucent rubber plate 23. The circuit board also has two light emitting elements 5 mounted at an upper end of the circuit board 14. A sound emitting element (speaker) 11 is connected to sound circuitry on the circuit board 14. A sound circuitry is constructed and arranged to cause a sound emitting element 11 to emit a specific sound or words upon pushing a sound actuation push button 22 extending upward from and being part of an upper translucent rubber plate 23. The circuit board also has two light emitting elements 5 mounted at an upper end of the circuit board 14. A insulating plate 24 with holes 25 is positioned over the circuit board 14 and a contact plate 26 is positioned on the insulating plate 24. The contact plate 26 has a plurality of contacts 27 on a underside 28, designed to make contact with a contact(s) 29 on the circuit board 14. The insulating plate 24 also has holes 25 aligned with the holes 30 in the contact plate 26 and each pair of aligned holes 25 and 30 are aligned with a light emitting element 5 on the circuit board 14 one of the light emitting elements 5 protrudes upward through the aligned holes 25 and 30. The insulating plate 24 and contact plate 26 also have holes 25 and 30 which are aligned with a sound emitting element 11 on the circuit board 14. A translucent push button projection guiding plate 31 that has a plurality of though holes 32 that are aligned with the contacts 29 on the contact plate 26 is positioned over the contact plate 26. A push button projection guiding plate 31 has recesses 33 in its lower surface 34 into which the upper part of a light emitting element 5 is seated. The push button projection guiding plate 31 also has a hole 32 which aligned with a sound emitting element 11 on the circuit board 14.

A translucent rubber plate 23 is seated on a push button projection guiding plate 31. The translucent rubber plate 23 has a plurality of upwardly protruding push buttons 22 on its upper surface 35. A push button 22 extends upward through a hole 20 in a upper case 15. On a lower surface 36 of the rubber plate 23 is plurality of depending pressing projections 37 each of which is aligned with a push button 22 and extends downward through respective through holes 32 in a push button guiding plate 31. A translucent rubber plate 23 a upper case 15 is joined with a lower case 17 by non toxic adhesive. The upper case 15 has a plurality of holes 20 through which push buttons 22 protrude.

OPERATION

The operation of the educational toy 19 having the construction described above is described below.

When the educational toy 19 is manipulated the following functions are available. The exterior top view of the housing of the unit FIG. 1 will be the reference drawing for operating features. When the on 1 and off 2 buttons are depressed all of the light emitting elements 5 flash due to the lighting circuit for the lighting elements 5 on the circuit board 14 being closed. The lighting elements 5 emit light for several seconds (i.e.; six seconds). This light can be seen through the translucent rubber plate 23 and the push buttons 22 protruding through the upper case 15 depressing the on 1 and off 2 button also simultaneously activates the sound circuitry on the circuit board 14 causing the sound emitting element 11 to emit a buzz and a chime. When the TV button 3 is depressed the light emitting elements 5 in the top right corner flash randomly. Simultaneously the sound emitting element 11 emits the word TV. as shown in the exterior top view of the housing of the unit FIG. 1 ten of the push buttons 22 protruding from the translucent rubber plate 23 through the upper case 15 are numbered 0,1,2,3,4,5,6,7,8,9. These ten push buttons 22 contain light emitting elements 5. Each of these light emitting elements 5 can be individually activated by pressing the specific or corresponding push numbered button 22. As the specific numbered push button 22 is depressed sound circuitry is also activated to cause the sound emitting element 11 to emit the word that corresponds to the number pushed (i.e.; depressing the button numbered 2 will cause the light for that button to flash and the word two to be heard). When the channel push button(s) 6 is depressed the next number (0–9) in line is announced by the sound emitting element 11 and the lighting emitting element 5 under the button(s) 6 emit light for two seconds. Depressing the volume push button 7 results in a moderate increase or decrease in the level of sound produced by the sound emitting element 11. Simultaneously the light emitting element 5 for the volume push button 7 emits light for 2 seconds after the button 7 is depressed. When the mute button 8 is depressed the sound circuitry causes the sound emitting element 11 to produce a chime. Simultaneously the light emitting elements 5 in the top right hand corner flash.

Pressing the play push button 10 results in the lighting circuitry activating the lighting elements 5 that correspond to the numbered translucent push buttons 22 to flash in a random pattern for 6 seconds. After the random pattern ends the sound circuitry is activated causing the sound emitting element 11 to announce the word play. Simultaneously the light emitting element 5 under the play push button 22 emits light for 3 seconds. When the stop push button 9 is depressed the sound circuitry is activated resulting in the sound emitting element 11 producing a buzz followed by a chime. Simultaneously the light emitting element 5 that corresponds to the stop push button 9 emits light for 3 seconds. The two light emitting elements 5 at the upper end of the circuit board 14 flash when any of the push buttons 22 visible in FIG. 1 are depressed.

As is apparent from the above description the present invention provides a educational toy simulating a remote control 19 with light emitting elements 5 and a sound emitting element 11 that can interest and entertain a child while also having instructional value to introduce a child to numbers and several generally used words. It can also:

(a) introduce the child to a variety of colors.
(b) allow the child to model the behavior of adults without the need to use the real remote control in the home.
© be user friendly for children with auditory or visual disabilities.
(d) attractive but relatively inexpensive.
(e) hand held and transportable.
(f) battery operated.
(g) improve safety by reducing the probability of the battery chamber being accessible to the child.

While our above description contains many specifics these should not be construed as limitations on the scope of the invention, but one preferred embodiment there of. Many other variations are possible for example. The lighting elements and push buttons can be arranged in a different configuration. The sound emitting element can produce different sounds or language then those indicated above or it can be eliminated. The upper and lower case can be constructed of any material that is durable, light weight and will not fracture, such as polyethylene, polypropylene, vinyl, nylon, rubber, leather, various impregnated or laminated fibrous materials, various plasticizied materials, etc. The color and shape of the outer housing can also vary.

We claim:

1. An educational toy simulating a remote control device, comprising:
    a housing having an upper surface, a lower surface, an upper edge and a lower edge;
    a plurality of translucent function keys on said upper surface of said housing;
    a plurality of translucent numeric keys on said upper surface of said housing;
    a plurality of translucent lights of said upper edge of said housing;
    lighting elements associated with each of said translucent function keys, translucent numeric keys and translucent lights;
    a speaker located with in said housing for producing an audio output;
    first means for producing a synthesized audio output to said speaker which correlates to a simulated function performed by one of said function keys;
    second means for producing a synthesized audio output to said speaker which corresponds to a number on one of said numeric keys;
    controller means located within said housing for simultaneously actuating each of the following:
        (i) a lighting element associated with one of said keys;
        (ii) a lighting element associated with one of said translucent lights;
        (iii) one of said first and second means for producing a synthesized audio output.

2. The educational toy as claimed in claim 1, wherein said controller means further includes means for controlling a volume of audio output.

3. The educational toy as claimed in claim 1, wherein said housing further includes a play function button communicating with said controller means and said controller means further includes means for randomly lighting said lighting elements.

4. The educational toy as claimed in claim 1, wherein said toy is self contained and does not communicate with external electronic devices.

5. The educational toy as claimed in claim 1, wherein said toy is configured to simulate a remote control device for an electronic appliance.

* * * * *